United States Patent [19]
Shaw et al.

[11] Patent Number: 4,469,397
[45] Date of Patent: Sep. 4, 1984

[54] FIBER OPTIC RESONATOR

[75] Inventors: Herbert J. Shaw; Marvin Chodorow, both of Stanford; Loren F. Stokes, Palo Alto, all of Calif.

[73] Assignee: Board of Trustees of the Leland Stanford Junior University, Stanford, Calif.

[21] Appl. No.: 426,890

[22] Filed: Sep. 29, 1982

[51] Int. Cl.³ .............................................. G02B 5/172
[52] U.S. Cl. .................................................. 350/96.15
[58] Field of Search ............... 350/96.15, 96.16, 96.20, 350/96.21, 96.22; 372/6

[56] References Cited

U.S. PATENT DOCUMENTS

| | | | |
|---|---|---|---|
| 4,002,997 | 1/1977 | Thompson | 350/96.15 X |
| 4,136,929 | 1/1979 | Suzaki | 350/96.15 |
| 4,325,636 | 4/1982 | Schiffner | 356/350 |
| 4,342,499 | 8/1982 | Hicks, Jr. | 350/96.15 |
| 4,354,760 | 10/1982 | Schiffner | 356/350 |
| 4,389,090 | 6/1983 | LeFevre | 350/96.29 |

FOREIGN PATENT DOCUMENTS 702240 12/1979 U.S.S.R. .......................... 350/96.15

OTHER PUBLICATIONS

LeFevre, *Electronics Letters*, vol. 16, No. 20, Sep. 25, 1980, "Single-Mode Fibre Fractional Wave Devices . . .", pp. 778–780.
Bergh et al., *Electronics Letters*, vol. 16, No. 7, Mar. 27, 1980, "Single-Mode Fibre Optic Directional Coupler", pp. 260–261.
Ezekiel, S.; Cole, J. A.; Harrison, J.; and Sanders, G.; "Passive Cavity Optical Rotation Sensor", *SPIE*, vol. 157, *Laser Inertial Rotation Sensors*, 1978, pp. 68–72.
Jackson, D. A.; Dandridge, A.; and Sheem, S. K., "Measurement of small phase shifts using a single-mode optical-fiber interferometer", *Optics Letters*, vol. 5, No. 4, Apr. 1980, pp. 139–141.
Hill, K. O.; Kawasaki, B. S.; and Johnson, D. C., "cw Brillouin Laser", *Applied Physics Letters*, vol. 28, No. 10, May 15, 1976, pp. 608–609.
Ponikvar, Donald R. and Ezekiel, Shaoul, "Stabilized Single-Frequency Stimulated Brillouin Fiber Ring Laser", *Optics Letters*, vol. 6, No. 8, Aug. 1981, pp. 398–400.
Jackson, D. A.; Priest, R.; Dandridge, A.; and Tveten, A. B., "Elimination of Drift in a Single-Mode Optical Fiber Interferometer Using a Piezoelectrically Stretched Coiled Fiber", *Applied Optics*, vol. 19, No. 17, Sep. 1, 1980, pp. 2926–2929.
Sanders, G. A.; Prentiss, M. G.; and Ezekiel, S., "Passive Ring Resonator Method for Sensitive Inertial Rotation Measurements in Geophysics and Relativity", *Optics Letters*, vol. 6, No. 11, Nov. 1981, pp. 569–571.
Petuchowski, S. J.; Giallorenzi, T. G.; and Sheem, S. K., "A Sensitive Fiber Optic Fabry-Perot Interferometer", *IEEE Journal of Quantum Electronics*, vol. QE-17, No. 11, Nov. 1981, pp. 2168–2170.

*Primary Examiner*—William L. Sikes
*Assistant Examiner*—Frank González
*Attorney, Agent, or Firm*—Knobbe, Martens, Olson and Bear

[57] ABSTRACT

A fiber optic resonator comprises a single strand of optical fiber forming a loop and a fiber optic directional coupler for optically closing the loop. The length of the loop is selected to cooperate with the phase shift of the coupler to provide a resonant cavity, and the coupling constant is selected to provide full or maximum resonance with zero output power.

31 Claims, 10 Drawing Figures

FIBER OPTIC RESONATOR

BACKGROUND OF THE INVENTION

The present invention relates to optical resonators, and particularly to fiber optic resonators.

Optical resonators typically comprise a pair of parallel, dielectric mirrors, separated by a small distance. Light incident on the mirrors makes multiple reflections therebetween, with a portion of the light escaping from between the mirrors on each reflection. The escaping light will interfere constructively and destructively, forming a fringe pattern. By analyzing the fringe pattern, the spectral content of the incident light may be ascertained, and thus, the resonator may function as a spectrum analyzer.

The free spectral range (i.e., the difference between resonant frequencies) of such a resonator is inversely proportional to twice the distance between the mirrors. However, because of problems associated with aligning the mirrors at large distances, the free spectral range is usually relatively large. For example, if the mirrors are separated by 1 meter, the free spectral range would be about 1500 MHz. Such a large free spectral range makes it difficult to distinguish frequency spectrum components which have small frequency separations.

In another type of resonator, the resonant cavity is formed from both fiber optic and optic components (e.g., mirrors or beam splitters coupled to a length of optical fiber). However, these hybrid devices also suffer from alignment problems. Further, the round trip losses of light circulating in the resonant cavity are quite high, resulting in a relatively low finesse.

SUMMARY OF THE INVENTION

The resonator of the present invention utilizes an all fiber optic resonant cavity. The resonant cavity is formed from a loop of optical fiber, which is closed, without splices, by means of a tunable, evanescent field, fiber optic directional coupler. Single frequency light is input to the resonator by a laser having a relatively long coherence length, such as a helium neon laser. The length of the fiber loop is such that, as light circulates therethrough, the circulating light constructively interferes with the optical input signal. From an energy conservation viewpoint, the circulating optical wave increases in intensity until an equilibrium is reached, where the power dissipated by resonator losses equals the power of the optical input signal. The resonator losses are quite low, e.g., on the order of 5%, yielding a finesse substantially greater than that obtainable with prior art fiber resonators. For example, a finesse of 80 was observed during one test of the resonator. As improvements are made to further reduce coupler losses, a finesse of well over 100 can be expected. This high finesse makes the resonator of the present invention particularly suitable for use as a sensor, as well as a spectrum analyzer. With a 3-meter loop, the free spectral range of the resonator is about 68.7 MHz.

The length of the fiber loop is selected so that the round trip optical path thereabout is equal to an integral number of wavelengths. The coupler provides phase shift of $+\pi/2$ for cross-coupled light, but no phase shift for light that is not cross-coupled. This coupler characteristic is advantageously utilized to cause the light circulating in the loop to constructively interfere with the input light, while causing output light to destructively interfere with the input light, thereby permitting the power of the circulating light to build up to the equilibrium value. The coupling constant of the coupler is chosen so that, at equilibrium, the amplitudes of the interfering lightwave components at the output port of the coupler are equal. Such selection of the coupling constant and loop length provides maximum circulating power, with zero output power.

DESCRIPTION OF THE DRAWINGS

These and other advantages of the present invention are best understood through reference to the drawings in which.

DESCRIPTION OF THE PREFERRED EMBODIMENT

Figure 1:
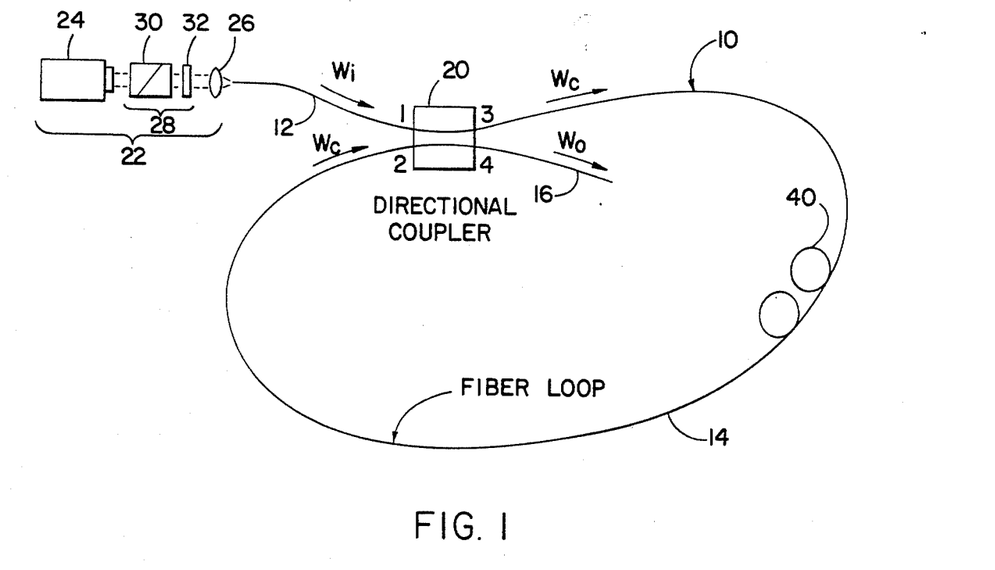
FIG. 1 is a schematic drawing of the resonator of the present invention showing a light source for introducing light into the fiber loop, and a fiber optic directional coupler for closing the fiber loop.

As shown in FIG. 1, the resonator of the present invention comprises a continuous, uninterrupted strand 10 of single mode optical fiber, having an input end portion 12, a loop portion 14, and an output end portion 16. At the ends of the loop portion 14, the fiber 12 is optically coupled together by means of a fiber optic, evanescent field, four port, directional coupler 20, having ports 1 and 2 on one side thereof, and ports 3 and 4 on the other side thereof. Tracing the fiber 12 from one end to the other, the fiber 10 first passes through ports 1 and 3, and then through ports 2 and 4, so that the loop 14 extends from ports 3 and 2, while the input portion 12 extends from port 1, and the output portion 16 extends from port 4.

A laser source 22 is provided to introduce light into the input fiber portion 12, for circulation through the loop portion 14. The source 22 comprises a single frequency, continuous wave, long coherence length laser 24, such as a Tropel model 200 HeNe gas laser. This laser produces single frequency light at a wavelength of 632.8 nm and has a coherence length of well over a kilometer.

A lens 26 may be used to focus light from the laser 24 for introduction into the fiber portion 12. In addition, an optical isolator 28, comprising a polarizer 30 and a quarterwave plate 32 may be interposed between the laser 24 and lens 26 to prevent light reflected from the lens 26 and input fiber portion 12 from entering the laser 24, and interfering with its operation.

In the embodiment shown, the fiber 10 comprises an ITT single mode fiber having a core diameter of 4 microns, an effective core area of $1.6 \times 10^{-7} cm^2$, an effective refractive index of 1.46, and an attenuation of 8.3 db/km. The loop 14 is 3 meters in length and includes a polarization controller 40 to provide compensation for fiber birefringence in the loop 14, so that circulating light at port 2 of the coupler 20 has substantially the same polarization as light from the laser source 22 at the port 1.

Both the polarization controller 40 and the coupler 20 are fiber optic, as distinguished from bulk optic components.

The Coupler 20

A preferred fiber optic directional coupler for use as the coupler 20 in the resonator of the present invention is described in copending patent application Ser. No. 300,955, filed Sept. 10, 1981, entitled FIBER OPTIC DIRECTIONAL COUPLER, which is a continuation-in-part of application Ser. No. 139,511, filed Apr. 11, 1980, entitled FIBER OPTIC DIRECTIONAL COUPLER, both of which are assigned to the assignee of the present invention. In addition, the coupler is described in the Mar. 29, 1980 issue of *Electronics Letters*, Vol. 16, No. 7, pages 260-261. These patent applications and publication are hereby incorporated by reference herein.

Figure 2:
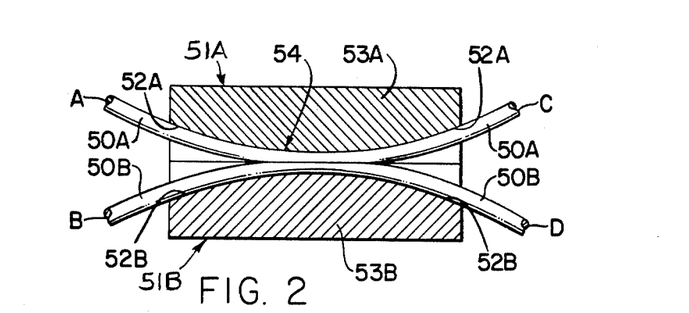
FIG. 2 is a sectional view of one embodiment of a fiber optic directional coupler for use in the resonator of FIG. 1.

As illustrated in FIG. 2, the coupler includes two exemplary strands 50A and 50B of a single mode fiber optic material mounted in longitudinal arcuate grooves 52A and 52B, respectively, formed in optically flat, confronting surfaces of rectangular bases or blocks 53A and 53B, respectively. The block 53A with the strand 50A mounted in the groove 52A will be referred to as the coupler half 51A, and the block 53B with the strand 50B mounted in the groove 52B will be referred to as the coupler half 51B.

The arcuate grooves 52A and 52B have a radius of curvature which is very large compared to the diameter of the fibers 50, and have a width slightly larger than the fiber diameter to permit the fibers 50, when mounted therein, to conform to a path defined by the bottom walls of the grooves 52. The depth of the grooves 52A and 52B varies from a minimum at the center of the blocks 53A and 53B, respectively, to a maximum at the edges of the blocks 53A and 53B, respectively. This advantageously permits the fiber optic strands 50A and 50B, when mounted in the grooves 52A and 52B, respectively, to gradually converge toward the center and diverge toward the edges of the blocks 53A,53B, thereby eliminating any sharp bends or abrupt changes in direction of the fibers 50 which may cause power loss through mode perturbation. In the embodiment shown, the grooves 52 are rectangular in cross-section, however, it will be understood that other suitable cross-sectional contours which will accommodate the fibers 50 may be used alternatively, such as a U-shaped cross-section or a V-shaped cross-section.

At the centers of the blocks 53, in the embodiment shown, the depth of the grooves 52 which mount the strands 50 is less than the diameter of the strands 50, while at the edges of the blocks 53, the depth of the grooves 52 is preferably at least as great as the diameter of the strands 50. Fiber optic material was removed from each of the strands 50A and 50B, e.g., by lapping, to form respective oval-shaped planar surfaces, which are coplanar with the confronting surfaces of the blocks 53A,53B. These oval surfaces, where the fiber optic material has been removed, will be referred to herein as the fiber "facing surfaces". Thus, the amount of fiber optic material removed increases gradually from zero towards the edges of the blocks 53 to a maximum towards the center of the blocks 53. This tapered removal of the fiber optic material enables the fibers to converge and diverge gradually, which is advantageous for avoiding backward reflection and excess loss of light energy.

In the embodiment shown, the coupler halves 51A and 51B are identical, and are assembled by placing the confronting surfaces of the blocks 53A and 53B together, so that the facing surfaces of the strands 50A and 50B are juxtaposed in facing relationship.

An index matching substance (not shown), such as index matching oil, is provided between the confronting surfaces of the blocks 53. This substance has a refractive index approximately equal to the refractive index of the cladding, and also functions to prevent the optically flat surfaces from becoming permanently locked together. The oil is introduced between the blocks 53 by capillary action.

An interaction region 54 is formed at the junction of the strands 50, in which light is transferred between the strands by evanescent field coupling. It has been found that, to ensure proper evanescent field coupling, the amount of material removed from the fibers 50 must be carefully controlled so that the spacing between the core portions of the strands 50 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 50 is within the critical zone, each strand receives a significant portion of the evanescent field energy from the other strand, and good coupling is achieved without significant energy loss. The critical zone includes that area in which the evanescent fields of the fibers 50A and 50B overlap with sufficient strength to provide coupling, i.e., each core is within the evanescent field of the other. However, as previously indicated, mode perturbation occurs when the cores are brought too close together. For example, it is believed that, for weakly guided modes, such as the HE$_{11}$ mode in single mode fibers, such mode perturbation begins to occur when sufficient material is removed from the fibers 50 to expose their cores. Thus, the critical zone is defined as that area in which the evanescent fields overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown, the required center-to-center spacing between the strands 50 at the center of the coupler is typically less than a few (e.g., 2-3) core diameters.

Preferably, the strands 50A and 50B (1) are identical to each other; (2) have the same radius of curvature at the interaction region 54; and (3) have an equal amount of fiber optic material removed therefrom to form their respective facing surfaces. Thus, the fibers 50 are symmetrical, through the interaction region 54, in the plane of their facing surfaces, so that their facing surfaces are coextensive if superimposed. This ensures that the two fibers 50A and 50B will have the same propagation characteristics at the interaction region 54, and thereby avoids coupling attenuation associated with dissimilar propagation characteristics.

The blocks or bases 53 may be fabricated of any suitable rigid material. In one presently preferred embodiment, the bases 53 comprise generally rectangular blocks of fused quartz glass approximately 1 inch long, 1 inch wide, and 0.4 inch thick. In this embodiment, the fiber optic strands 50 are secured in the slots 52 by suitable cement, such as epoxy glue. One advantage of the fused quartz blocks 53 is that they have a coefficient of thermal expansion similar to that of glass fibers, and this advantage is particularly important if the blocks 53 and fibers 50 are subjected to any heat treatment during the manufacturing process. Another suitable material for the block 53 is silicon, which also has excellent thermal properties for this application.

The coupler of FIG. 2 includes four ports, labeled A, B, C, and D, which correspond to the ports 1, 2, 3, and 4, respectively, of the coupler 20 in FIG. 1. When viewed from the perspective of FIG. 2, ports A and B, which correspond to strands 50A and 50B, respectively, are on the left-hand side of the coupler, while the ports C and D, which correspond to the strands 50A and 50B, respectively, are on the right-hand side of the coupler. For the purposes of discussion, it will be assumed that input light is applied to port A. This light passes through the coupler and is output at port C and/or port D, depending upon the amount of power is coupled between the strands 50. In this regard, the term "coupling constant" is defined as the ratio of the coupled power to the total output power. In the above example, the coupling constant would be equal to the ratio of the power at port D of the sum of the power output at ports C and D. This ratio is also referred to as the "coupling efficiency", and when so used, is typically expressed as a percent. Thus, when the term "coupling constant" is used herein, it should be understood that the corresponding coupling efficiency is equal to the coupling constant times 100. For example, a coupling constant of 0.5 is equivalent to a coupling efficiency of 50%.

The coupler may be "tuned" to adjust the coupling constant to any desired value between zero and 1.0, by offsetting the facing surfaces of the blocks 53. Such tuning may be accomplished by sliding the blocks 53 laterally relative to each other.

The coupler is highly directional, with substantially all of the power applied at one side of the coupler being delivered to the other side of the coupler. That is, substantially all of the light applied to input port A is delivered to the ports C and D, without contra-directional coupling to port B. Likewise, substantially all of the light applied to port B is delivered to the ports C and D. Further, this directivity is symmetrical, so that substantially all of the light applied to either port C or input port D is delivered to the ports A and B. Moreover, the coupler is essentially non-discriminatory with respect to polarizations, and thus, preserves the polarization of the light. Thus, for example, if a light beam having a vertical polarization is input to port A, the light cross-coupled from port A to port D, as well as the light passing straight through from port A to port C, will remain vertically polarized.

Light that is cross-coupled from one of the fibers to the other undergoes a phase shift of $+\pi/2$, while light that is not cross-coupled is not shifted in phase during propagation through the coupler. Thus, for example, if light is input to port A, the cross-coupled light of port D will be advanced in phase by $\pi/2$, while the light passing straight through to port C remains unchanged in phase.

The coupler is also a low loss device, having insertion or throughput losses typically on the order of 2-3 percent. The term "insertion loss", as used herein, refers to the real scattering losses of light passing through the coupler, from one side to the other. For example, if light is applied to port A, and 97% of that light reaches ports C and D (combined), the insertion loss would be 0.03 (3%). The term "coupler transmission" is defined as one minus the insertion loss. Thus, if the insertion loss is 0.03 (3%), the coupler transmission is 0.97 (97%).

The Polarization Controller 40

One type of polarization controller suitable for use as the polarization controller 40 of FIG. 1 is described in U.S. Pat. No. 4,389,090, issued June 21, 1983 on patent application Ser. No. 183,975, filed Sept. 3, 1980, entitled FIBER OPTIC POLARIZATION CONTROLLER, assigned to the assignee of the present invention. In addition, such a polarization controller is described in the Sept. 25, 1980 issue of Electronics Letters, Vol. 16, No. 20, pages 778 to 780. This patent application and publication are hereby incorporated by reference herein.

Figure 3:
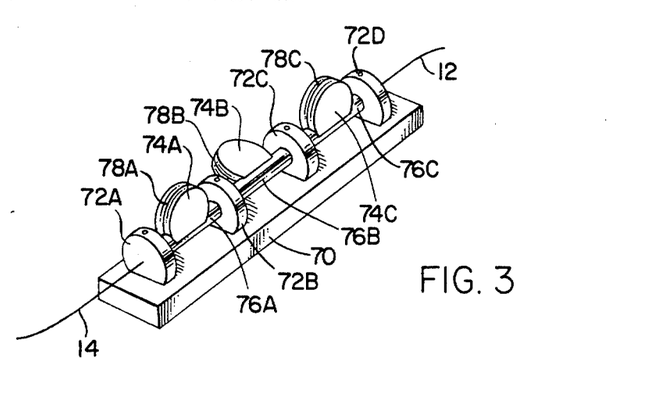
FIG. 3 is a perspective view of one embodiment of a fiber optic polarization controller for use in the resonator of FIG. 1.

As illustrated in FIG. 3, the controller includes a base 70 on which a plurality of upright blocks 72A through 72D are mounted. Between adjacent ones of the blocks 72, spools 74A through 74C are tangentially mounted on shafts 76A through 76C, respectively. The shafts 76 are axially aligned with each other, and are rotatably mounted between the blocks 72. The spools 74 are generally cylindrical and are positioned tangentially to the shafts 76, with the axes of the spools 74 perpendicular to the axes of the shafts 76. The fiber portion 14 (FIG. 1) extends through axial bores in the shafts 76 and is wrapped about each of the spools 74 to form three coils 78A through 78C. The radii of the coils 78 are such that the fiber 14 is stressed to form a birefringent medium in each of the coils 78. The three coils 78A through 78C may be rotated independently of each other about the axes of the shafts 74A through 74C, respectively, to adjust the birefringence of the fiber 14 and, thus, control the polarization of the light passing through the fiber 14. The diameter and number of turns in the coils 78 are such that the outer coils 78A and C provide a spatial delay of one-quarter wavelength, while the central coil 78B provides a spatial delay of one-half wavelength. The quarter wavelength coils 78A and C control the ellipticity of the polarization, and the half wavelength coil 78B controls the direction of polarization. This provides a full range of adjustment of the polarization of the light propagating through the fiber portion 14. It will be understood, however, that the polarization controller may be modified to provide only the two quarterwave coils 78A and C, since the direction of polarization (otherwise provided by the central coil 78B) may be controlled indirectly through proper adjustment of the ellipticity of polarization by means of the two quarterwave coils 78A and C. Accordingly, the polarization controller 40 is shown in FIG. 1 as including only the two quarterwave coils 78A and C. Since this configuration reduces the overall size of the controller 40, it may be advantageous for certain applications of the present invention involving space limitations.

Thus, the polarization controller 40 provides means for establishing, maintaining, and controlling the polarization of light propagating through the fiber portion 14.

Operation of the Resonator

Referring again to FIG. 1, in operation, light introduced from the source 20 into the fiber portion 12 propagates to port 1 of the coupler 20, where a portion of the light is coupled to port 4, with the remaining portion propagating to port 3. The light at port 4 propagates through the fiber portion 16, and out of the end of the fiber 10. However, the light at port 3 traverses the loop portion 14 and again enters the coupler at port 2, where a portion is coupled to port 3 while the remaining portion propagates to port 4, and through the fiber portion 16. It will be seen that the loop 14 and coupler 20 cooperate to provide a resonant cavity so that light entering the coupler at port 2 interferes with incoming light from the laser source 22. Such interference is constructive at port 3, while being destructive at port 4, thereby causing light to build up in the resonant cavity loop.

Hereinafter, the light from the source 22, propagating through the fiber portion 12 to port 1, will be referred to as the input signal wave $W_i$, while light exiting port 4, for propagation through the fiber portion 16, will be referred to as the output signal wave $W_o$. The light circulating in the loop portion 14 will be referred to as the circulating wave $W_c$.

As the circulating wave $W_c$ propagates about the loop 14, from port 3 to port 2, a fractional amount of its power will be lost, due to fiber transmission losses. The term "fiber transmission losses" is defined as the fractional loss during propagation through the fiber, from port 3 to port 2. In the embodiment shown, the fiber transmission losses are purely a function of fiber attenuation, so that the power or intensity of the wave $W_c$ at port 2 is equal to the power of the wave $W_c$ at port 3 times the quantity exp $(-2\alpha_o L)$, where L is the optical path length of the loop 14 for light circulating therethrough, excluding any phase shift of the coupler 20, and $\alpha_o$ is the amplitude attenuation coefficient of the fiber 10. It will be understood that, if an additional component (e.g., a fiber optic polarizer) is placed in the fiber loop, the losses attributable to this component are included within the definition of fiber transmission losses. In addition, the term "fiber transmission" is defined as the circulating wave power at port 2 divided by the circulating wave power at port 3. Stated another way, it is a fractional amount of power from port 3 that reaches port 2 (i.e., fiber transmission equals 1—fiber transmission losses).

In addition to being attenuated by fiber transmission losses, the circulating wave $W_c$ will be degraded slightly on each pass through the coupler 20, due to coupler insertion losses. Further, the power or intensity of the input wave $W_i$ will experience a loss, due to coupler insertion losses, during propagation through the coupler 20. In this regard, the coupler 20 may be modeled as a lossless device with an added lumped insertion loss ($\gamma_O$) that is independent of the coupling constant. The relationship between the coupler insertion loss and the complex amplitudes at each of the four ports of the coupler 20 is:

$$|E_3|^2+|E_4|^2=(1-\gamma_O)(|E_1|^2+|E_2|^2) \tag{1}$$

where: $E_1$, $E_2$, $E_3$, and $E_4$ are the complex electric field amplitudes at the coupler ports 1, 2, 3, and 4; and $\gamma_O$ is the coupler insertion loss (typically on the order of 2% to 10%).

The complex amplitudes at ports 3 and 4, after the coupled-mode interaction, are related to the field amplitudes at ports 1 and 2 as follows:

$$E_3=(1-\gamma_O)^{\frac{1}{2}}[(1-K)^{\frac{1}{2}}E_1+j\sqrt{K}E_2] \tag{2}$$

and, $$E_4=(1-\gamma_O)^{\frac{1}{2}}[j\sqrt{K}E_1+(1-K)^{\frac{1}{2}}E_2] \tag{3}$$

where K is the coupling constant. No coupling corresponds to K=0, whereas K=1 provides full coupling. $E_2$ and $E_3$ are further related in that:

$$E_2=E_3 e^{-\alpha_O L} e^{j\beta L} \tag{4}$$

where:

$$\beta=n\omega/c \tag{5}$$

and: $\alpha_O$ is the amplitude attenuation coefficient of the fiber; L is the length of the loop portion 14; n is the effective refractive index of the fiber; $\omega$ is the optical frequency; $\beta$ is the propagation constant of the fiber 10; and c is the speed of light.

For full resonance, the output wave $W_o$ should be zero, and thus, the ratio $E_4/E_1$ should be zero. Accordingly, by solving Equations 2, 3, and 4, for $E_4/E_1$ in terms of $\gamma_O$, K, $\alpha_O L$, and $\beta L$, and setting $E_4/E_1$ equal to zero, the conditions for resonance, in terms of the loop length L and the coupling constant K, may be found. One of the conditions necessary for resonance is that:

$$\beta L = q 2\pi - \pi/2 \tag{6}$$

where q is any integer.

Thus, for full resonance, the total phase delay ($\beta L$) around the loop 14, excluding any phase shift due to the coupler 20, must equal an integral number of $2\pi$ radians, less $\pi/2$.

Note that, from Equations 2 and 3, the directional coupler 20 has a $+\pi/2$ phase shift. By adding this phase shift to $\beta L$ in Equation 6, it may be seen that the total accumulated phase of the circulating wave $W_c$, as it traverses the loop 14 (e.g., from an arbitrary point on the loop, around the loop, back to that arbitrary point) is equal to $q(2\pi)$. As will be seen from a subsequent discussion, the loop length may be adjusted to satisfy this resonant condition, after assembly of the resonator, by mechanically stretching the fiber 14 using an electronically driven PZT cylinder about which the fiber 14 is wrapped.

Figure 4:
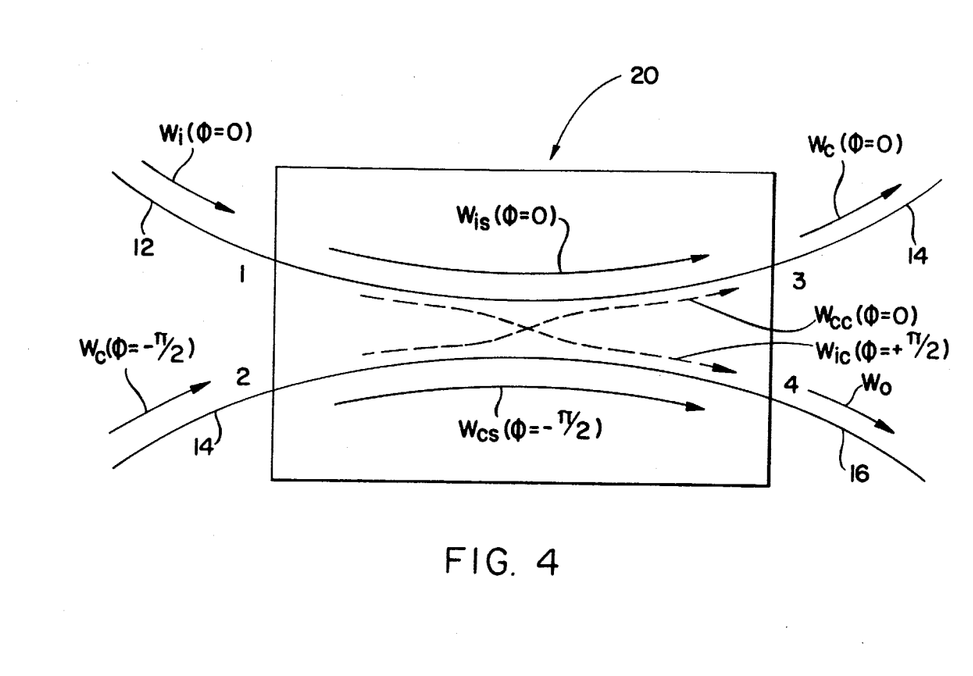
FIG. 4 is a schematic view of the fiber optic directional coupler shown in FIGS. 1 and 2, illustrating the phases of the lightwave components propagating therethrough.

The resonant condition, defined by Equation 6, may be more fully understood through reference to FIG. 4, which shows the manner in which the $\pi/2$ phase shift of the coupler 20 is advantageously utilized to provide constructive interference at port 3, and destructive interference at port 4. For the purposes of discussion, the coupler 20 may be viewed as having a point of effective coupling at the center of the coupler, with the ports 1, 2, 3, and 4 equidistant from this coupling point, and spaced therefrom by an integral number of wavelengths. The loop length (L) may be viewed as the distance from the coupling point, around the loop, back to the coupling point, which, for resonance, should be $q - \frac{1}{4}$ wavelengths, where q is an integer.

In regard to FIG. 4, the input signal wave $W_i$ will be assumed to be a reference wave having zero phase, and that the phases of all of other waves (i.e., $W_c$ and $W_o$) are defined relative to the input wave $W_i$. Further, any wave propagating through the coupler 20 will be divided into two components, namely, a "cross-coupled" component will be designated by the subscript "c", and a "straight through" component, which will be designated by the subscript "s". Thus, the input wave $W_i$ will be divided into a cross-coupled component $W_{ic}$, which propagates from port 1 to port 4, and a straight through component $W_{is}$ which propagates from port 1 to port 3. Similarly, the wave $W_c$ will be divided into a cross-coupled component $W_{cc}$, which propagates from port 2 to port 3, and a straight through component $W_{cs}$, which propagates from port 2 to port 4.

Assuming the source 22 is turned on at $t=0$, the input wave $W_i$ will enter port 1 of the coupler 20, with zero phase, for propagation therethrough. The cross-coupled component $W_{ic}$ will undergo a $+\pi/2$ phase shift during propagation to the port 4, while the straight through component $W_{is}$ will remain unchanged in phase during propagation to port 3. Thus, the light wave $W_c$ at port 3 will have a phase of zero. This wave $W_c$ then propagates about the loop 14 towards port 2. Assuming that the loop length L is chosen in accordance with Equation 6, the wave $W_c$, upon reaching port 2, will have a phase of $-\pi/2$. During propagation of the wave $W_c$ through the coupler 20, the cross-coupled component $W_{cc}$ undergoes a $+\pi/2$ phase shift, so that, upon reaching port 3, its phase is zero, the same as that of the input wave component $W_{is}$. Thus, the circulating wave component $W_{cc}$ will constructively interfere with the input wave component $W_{is}$ at port 3, thereby increasing the intensity of the circulating wave $W_c$ at port 3. The straight through component $W_{cs}$ of the circulating wave $W_c$, on the other hand, does not change in phase as it propagates from port 2 to port 4, so that, at port 4, its phase will still be $-\pi/2$. Thus, this component $W_{cs}$ will destructively interfere with the cross-coupled input light component $W_{ic}$, which has a phase of $+\pi/2$.

Figure 5:
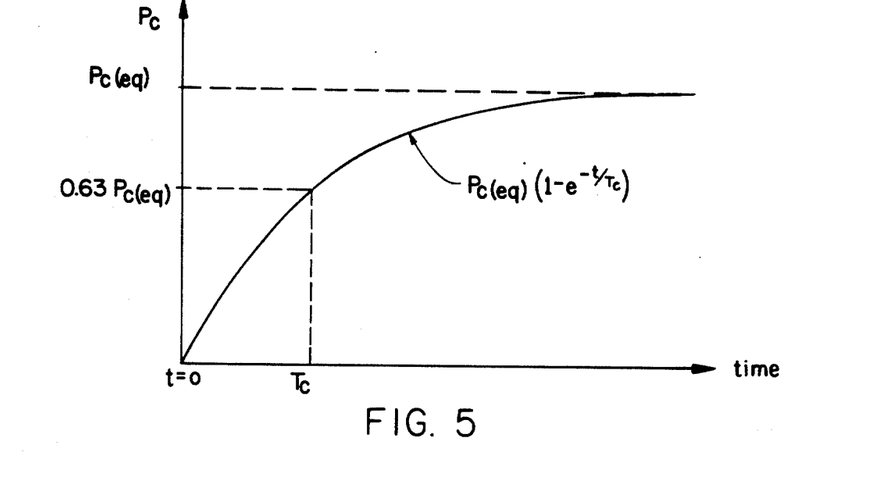
FIG. 5 is a graph of circulating power as a function of time, showing the circulating power asymptotically building up to an equilibrium value over a time period equal to the cavity rise time.

Consequently, as the wave $W_c$ circulates through the loop 14, it will constructively interfere with the input signal wave $W_i$ at port 3, and destructively interfere therewith at port 4, thereby gradually building up the power (intensity) $P_c$ of light circulating in the loop 14 until an equilibrium value $P_{c(eq)}$ is reached, as shown in FIG. 5. The time required for such light to build up to 63% (i.e., $1 - e^{-1}$) of the equilibrium value is defined as the cavity rise time ($T_c$), also commonly referred to as the cavity decay time.

In order to achieve fully resonance, and thus, zero output power at port 4, a second condition must be satisfied, namely, the straight through circulating wave component $W_{cs}$ at port 4 must have an amplitude equal to the amplitude of cross-coupled input signal component $W_{ic}$ at port 4. For this to occur, the coupling constant K is adjusted to a value $K_r$, which will be referred to hereinafter as the "resonant coupling constant". By solving Equations 2, 3, and 4 for $E_4/E_1$, and setting $E_4/E_1$ equal to zero (which is the condition for resonance), the resonant coupling constant $K_r$ may be found to be:

$$K_r = (1 - \gamma_0) \exp(-2\alpha_0 L) \tag{7}$$

In the embodiment shown, the coupler transmission is $1 - \gamma_0$ and the fiber transmission is $\exp(-2\alpha_0 L)$. Thus, $$K_r = \text{coupler transmission} \times \text{fiber transmission} \tag{8}$$

For the embodiment disclosed, the fiber attenuation is 8.3 dB/km, the loop 14 is 3 meters, so $2\alpha_0 L$ equals 0.0057 at a wavelength of 632.8 nm. With a coupler insertion loss of 3.2% ($-0.14$ dB), this yields a resonant coupling constant of 0.962.

Using the resonant coupling constant defined by Equation 7, Equations 2, 3, and 4 yield the following circulating power (intensity) and output power (intensity), normalized with respect to input power:

$$\left| \frac{E_3}{E_1} \right|^2 = \frac{P_{c(3)}}{P_i} = \frac{(1 - \gamma_0)(1 - K_r)}{(1 + K_r)^2 - 4K_r \sin^2(\beta L/2 - \pi 4)} \tag{9}$$

$$\left| \frac{E_4}{E_1} \right|^2 = \frac{P_o}{P_i} = (1 - \gamma_0) \left[ 1 - \frac{(1 - K_r)^2}{(1 + K_r)^2 - 4K_r \sin^2(\beta L/2 - \pi 4)} \right] \tag{10}$$

where $P_{c(3)}$ is the power (intensity) of the circulating wave $W_c$ at port 3; $P_i$ is the power (intensity) of the input signal wave $W_i$; and $P_o$ is the power (intensity) of the output wave $W_o$ at port 4.

If $\beta L$ is chosen to satisfy the resonant condition defined by Equation 6, Equation 9 reduces to:

$$\left| \frac{P_c}{P_i} \right|_{max} = \frac{1 - \gamma_0}{1 - K_r} \tag{11}$$

This equation may be rewritten as:

$$P_i = P_c(1 - K_r) + P_i \gamma_0 \tag{12}$$

If Equation 6 is satisfied, $1 - K_r$ is equal to the round-trip fractional intensity loss for the circulating wave $W_c$, (i.e., coupler insertion loss plus fiber transmission loss).

Thus, the right-hand side of Equation 12 represents the total power dissipated in the coupler 20 and loop 14. Accordingly, it may be seen from Equation 12 that, at full resonance, the circulating power $P_c$ is such that the total power dissipated in the loop and coupler equals the input power $P_i$ at port 1.

Figure 6:
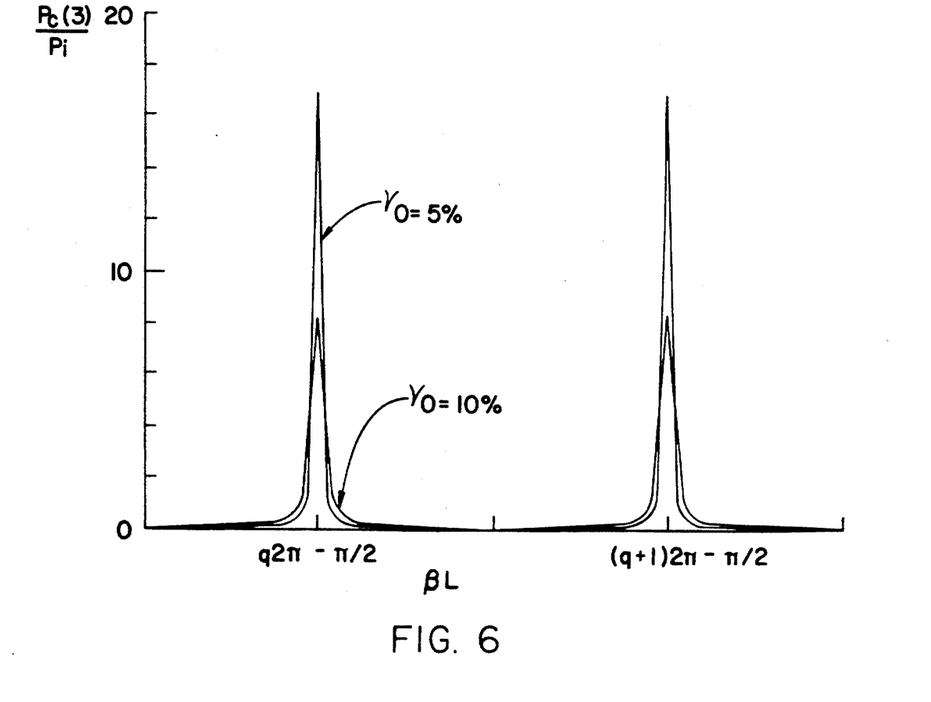
FIG. 6 is a graph of the circulating power at port 3, normalized with respect to the input power, as a function of the phase delay through the fiber loop, showing the normalized circulating power at resonance for exemplary coupler insertion losses of 5% and 10%.
Figure 7:
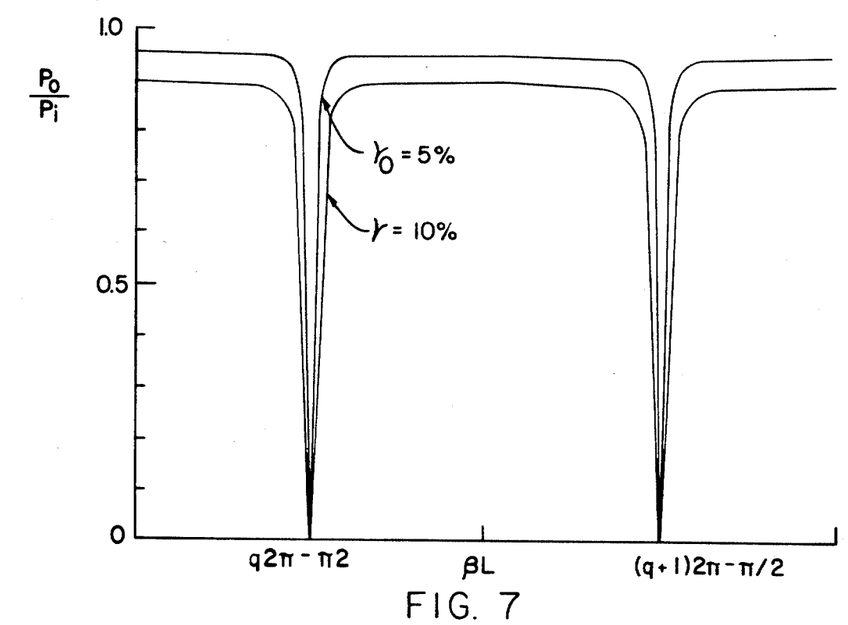
FIG. 7 is a graph of output power, normalized with respect to input power, as a function of the phase delay through the fiber loop, showing zero output power at resonance for both exemplary coupler insertion losses of 5% and 10%.

The theoretical normalized circulating power and output power, defined by Equations 9 and 10, respectively, are shown as a function of $\beta L$ for two exemplary coupler insertion loss values, namely, 5% and 10%, in FIGS. 6 and 7, respectively. As shown in FIG. 6, circulating power $P_c$ is highly dependent upon coupler insertion losses, being about 9 times the input power $P_i$ for an insertion loss of 10%, and almost 19 times input power $P_i$ for an insertion loss of 5%. The output power $P_o$, in contrast, drops to zero at full resonance in either case, as shown in FIG. 7. However, it will be seen that the minima and maxima of FIGS. 6 and 7 become sharper as insertion loss decreases, indicating that cavity finesse is highly dependent upon coupler insertion loss.

The cavity finesse (F) may be defined as:

$$F = \frac{FSR}{\delta f} \qquad (13)$$

Where FSR is the free spectral range of the resonant cavity (i.e., the distance between the minima (FIG. 7) or the maxima (FIG. 6)); and $\delta f$ is the width of the circulating power maxima (FIG. 6) at one-half of the maximum circulating power (i.e., at one-half power at full resonance). The free spectral range (FSR) may be defined as:

$$FSR = \frac{c}{nL} \qquad (14)$$

By setting Equation 9 equal to one-half $|P_{c(3)}/P_i|_{max}$, $$\delta f = \frac{c}{nL}\left\{1 - \frac{2}{\pi}\sin^{-1}\left[1 - \frac{(1-K_r)^2}{4K_r}\right]^{\frac{1}{2}}\right\} \qquad (15)$$

For $K_r$ near unity, $\delta f$ may be approximated as:

$$\delta f = \frac{c}{nL}\frac{1+K_r}{\pi\sqrt{K_r}} \qquad (16)$$

This approximation is within 0.2% for $K_r$ greater than 0.8.

Substituting Equation 14 and 16 into Equation 13, the cavity finesse is therefore:

$$F = \frac{\pi\sqrt{K_r}}{1-K_r} \qquad (17)$$

It will be recalled from Equation 8 that the resonant coupling constant ($K_r$) is equal to the product of coupler transmission and fiber transmission, so that the quantity $1-K_r$ is equal to the total fractional losses around the loop 14. It may be seen from Equation 17 that, as these fractional losses decrease, the finesse increases. Thus, the finesse is highly dependent upon losses, and may be increased by decreasing either the coupler insertion losses or the fiber transmission losses, or both. For the embodiment shown, the finesse is about 80 and the free spectral range is 34.5 MHz.

Finally, referring back to FIG. 5, the cavity rise time $T_c$ may be approximated as follows:

$$T_c = \frac{nL/c}{2(1-K_r)} \qquad (18)$$

In the embodiment shown, the cavity rise time is about 192 nsec. For resonant effects, the laser source 22 should have a coherence length greater than $cT_c$.

Figure 8:
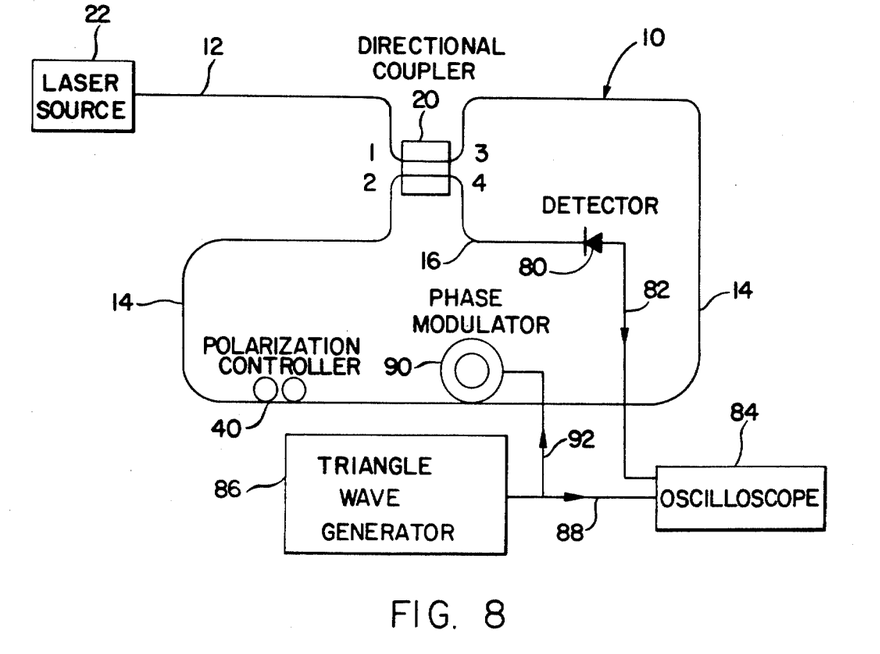
FIG. 8 is a schematic drawing of one embodiment of the present invention, which may be used as an optical spectrum analyzer.

Referring to FIG. 8, the resonant effects predicted by Equations 9 and 10 may be observed by providing a detector 80 for measuring the optical power (intensity) of the output wave $W_o$ at the end of the fiber portion 16. The detector 80 outputs an electrical signal, on a line 82, which is proportional to the optical intensity of the output wave $W_o$. This line 82 is connected to input such signal to an oscilloscope 84. A signal from a triangle wave generator 86 is provided to the oscilloscope 84 on a line 88, and to a phase modulator 90 on a line 92. By way of specific example, the phase modulator may comprise a PZT cylinder having a 3-inch diameter, about which a portion of the fiber loop 14 is wrapped 6 times. The signal from the trianglewave generator 86 drives the PZT cylinder 90 to expand radially, and thus, linearly stretch the fiber 14 to periodically vary the fiber length (L) at the generator 86 frequency. In this configuration, the behavior of the fiber resonator is somewhat analogous to that of a scanning Fabry-Perot interferometer.

Figure 9:
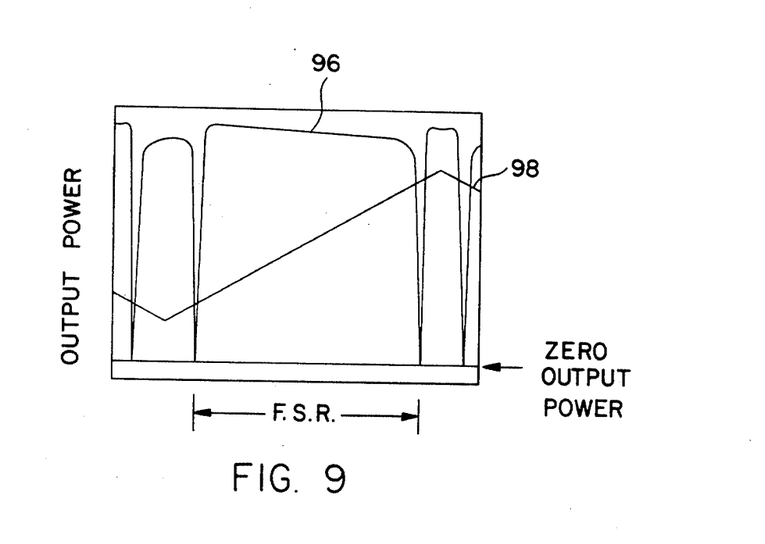
FIG. 9 is a graph illustrating resonant behavior for the embodiment shown in FIG. 8.

FIG. 9 shows the oscilloscope traces of the detector current 96, representing the optical output power ($P_o$), and the triangular wave generator signal 98, representing the amount that the fiber is stretched by the phase modulator 90. The amount of fiber elongation provided by the signal 98 is slightly more than a wavelength, so that the output power shown in FIG. 9 drops to zero twice during each linear stretch of the fiber, thus demonstrating resonant behavior. If the coupling constant is varied slightly from the resonant coupling constant $K_r$, non-zero output power is observed at the minima of the curve 96.

Figure 10:
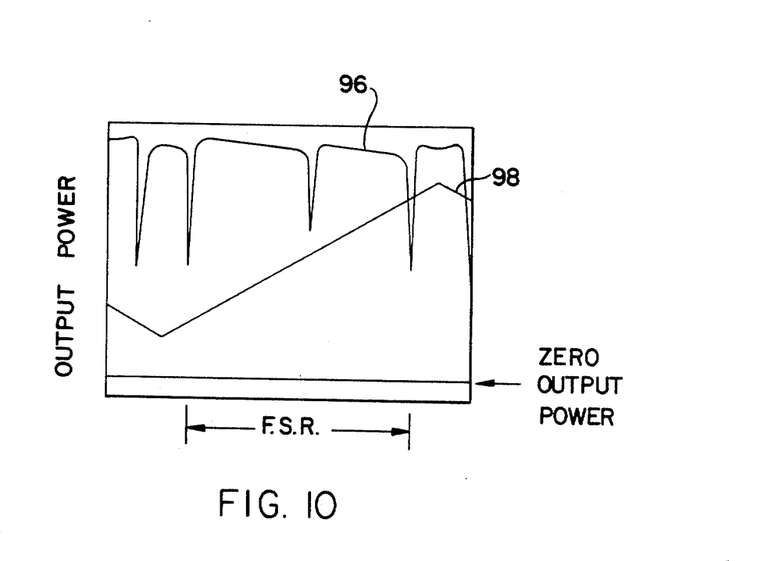
FIG. 10 is a graph, similar to that of FIG. 9, showing the effect, upon resonant behavior, of misaligning the polarization controller so that light propagates in both polarization modes.

The importance of maintaining polarization of light in the fiber loop 14, e.g., by means of the polarization controller 40, is illustrated in FIG. 10, which shows the results of rotating the quarterwave loops of the polarization controller 40 away from the optimum position. As shown therein, two resonant modes, corresponding to the two independent polarization modes, are observed. The two modes resonate at different scanned positions due to slightly different propagation velocities. Both resonant modes have non-zero output power because, when one mode is resonating the other is not, and thus, the output power of a non-resonant mode is observed at resonance of either mode.

The resonator of the present invention may be utilized as a frequency filter by adjusting the length of the loop 14 to resonate at the desired frequency, so that the resonator blocks this frequency, while passing other frequencies. In addition, the circuit of FIG. 8 may be used as a spectrum analyzer by inputting light of unknown frequency components into the fiber portion 12. Since each frequency component will resonate at a different loop length L, the oscilloscope tracing will show separate minima corresponding to each frequency. The relative depths of the minima indicate the relative magnitudes of the frequency components, while the spacing between the minima indicate their relative frequency separation.

What is claimed is:

1. A fiber optic resonator, comprising:
    a strand of optical fiber having first and second end portions, and forming a loop portion between said end portions;
    fiber optic coupling means for optically closing said loop; and
    the length of said loop portion selected to cooperate with said coupling means to form a resonant cavity for light propagating therethrough.

2. A fiber optic resonator, defined in claim 1, wherein the total phase delay around said loop for said light propagating therethrough is equal to an integer times $2\pi$.

3. A fiber optic resonator, defined in claim 2, wherein said coupling means provides $\pi/2$ of said total phase delay.

4. A fiber optic resonator, defined in claim 1, wherein said coupling means has a coupling constant selected in accordance with the following equation:

$$K_r = (1 - \gamma_o) \exp(-2\alpha_o L)$$

where:
    $\gamma_o$ is the insertion loss of said coupling means;
    $\alpha_o$ is the amplitude attenuation coefficient of said fiber; and
    L is the length of said fiber loop.

5. A fiber optic resonator, as defined in claim 1, additionally comprising:
    means for controlling the polarization of light propagating through said fiber loop portion.

6. A fiber optic resonator, as defined in claim 5, wherein said polarization controlling means comprises a loop formed from a portion of said fiber loop portion.

7. A fiber optic resonator, as defined in claim 1, additionally comprising:
    means for varying the length of said fiber.

8. A fiber optic resonator, as defined in claim 7, wherein said varying means comprises:
    a PZT cylinder, about which a portion of said fiber loop portion is wrapped.

9. A fiber optic resonator, as defined in claim 8, additionally comprising:
    means for applying a ramp signal to drive said PZT cylinder to linearly stretch said fiber.

10. A fiber optic resonator, as defined in claim 1, additionally comprising:
    a light source, for introducing light into said resonant cavity, said light source having a coherence length at least equal to the rise time of said resonant cavity times the free space velocity of light.

11. A fiber optic resonator, as defined in claim 1, wherein the intensity of said light in said resonant cavity is dependent upon (a) the length of said fiber loop, and (b) the coupling constant of said coupling means, said intensity at a maximum where (i) said loop length L is such that $$L = \frac{q(2\pi) - \pi/2}{\beta}$$

where q is any integer, and $\beta$ is the propagation constant of said fiber, and (ii) said coupling constant $K_r$ is such that:
    $K_r$ = fiber transmission x coupling means transmission 12. A fiber optic resonator, comprising:
    a continuous, uninterrupted length of optical fiber having a first end portion and a second end portion;
    a light source, for introducing light into said fiber for propagation from said first end portion to said second end portion;
    fiber optic coupling means for optically coupling said fiber together to form a loop between said first and second end portions, said coupling means coupling a portion of said source light to circulate in said loop, and coupling another portion of said source light to said second end portion, the length of said loop selected to cause said circulating light to destructively interfere with light from said source that is coupled to said second portion and constructively interfere with light from said source that is coupled to said loop, said interference causing the optical power in said loop to increase above that in said first end portion.

13. A fiber optic resonator, as defined in claim 12, wherein said coupling means comprises an evanescent field, fiber optic directional coupler.

14. A fiber optic resonator, as defined in claim 12, wherein the relative amplitudes of said destructively interfering light are dependent upon the coupling constant of said coupling means.

15. A fiber optic resonator, as defined in claim 14, wherein said coupling constant is selected according to the following equation:

$$K_r = (1 - \gamma_o) \exp(-2\alpha_o L)$$

where:
    $\gamma_o$ is the insertion loss of said coupling means;
    $\alpha_o$ is the amplitude attenuation coefficient of said fiber; and
    L is the length of said loop portion.

16. A fiber optic resonator, as defined in claim 12, wherein the length of said optical fiber is selected so that the total phase delay around said loop is equal to an integer times $2\pi$.

17. A fiber optic resonator, as defined in claim 14, wherein said coupling means provides $\pi/2$ of said total phase delay.

18. A fiber optic resonator, as defined in claim 12, additionally comprising:
    means for detecting light output from said second fiber portion.

19. A fiber optic resonator, as defined in claim 12, wherein said coupler and said fiber loop portion cooperate to form a resonant cavity, said light source having a coherence length greater than the cavity rise time of said resonant cavity times the free space velocity of light.

20. A fiber optic resonator, comprising:
    a single, uninterrupted strand of optical fiber;
    a fiber optic directional coupler having four ports, namely ports 1, 2, 3, and 4, said single, uninterrupted strand of fiber extending through all of said ports, said fiber having a loop portion optically connecting ports 2 and 3, a fiber input portion at port 1 and a fiber output portion at port 4;

a light source for inputting a continuous lightwave ($W_i$) into said fiber input portion;

said coupler splitting said input lightwave ($W_i$) into two components, namely a straight through component ($W_{is}$), which propagates from port 1 to port 3, and a cross-coupled component ($W_{ic}$), which propagates from port 1 to port 4, said straight through component ($W_{is}$) providing at least a portion of a circulating wave ($W_c$) which circulates through said loop portion from port 3 to port 2, said coupler splitting said circulating wave ($W_c$), after traversing said loop, into two components, namely a straight through component ($W_{cs}$) which propagates from port 2 to port 4, and a cross-coupled component ($W_{cc}$), which propagates from port 2 to port 3; and said cross-coupled input wave component ($W_{ic}$) destructively interfering with said straight through circulating wave component ($W_{cs}$), and said cross-coupled circulating wave component ($W_{cc}$) constructively interfering with said straight through input wave component ($W_{is}$).

21. A fiber optic resonator, as defined in claim 20, additionally comprising:

means for equalizing the amplitude of said cross-coupled input wave component ($W_{ic}$) and said straight through circulating wave component ($W_{cs}$).

22. A fiber optic resonator, as defined in claim 21, wherein said equalizing means comprises said coupling means.

23. A fiber optic resonator, as defined in claim 22, wherein the coupling constant of said coupling means is selected to equal the product of fiber transmission and coupler transmission.

24. A fiber optic resonator, as defined in claim 20, wherein said cross-coupled components ($W_{cc}$ and $W_{ic}$) undergo a $\pi/2$ phase shift through said coupler.

25. A fiber optic resonator, as defined in claim 24, wherein the length of said loop portion is selected to provide a phase delay for said circulating wave ($W_c$) of $(q)2\pi - \pi/2$, where q is any integer.

26. A method of forming a resonant cavity from an optical fiber, comprising:

forming a loop in said fiber;

optically closing said loop with a fiber optic directional coupler; and selecting the length of said loop for resonance.

27. A method of forming a resonant cavity from an optical fiber, as defined in claim 26, additionally comprising:

selecting the length of said loop so that the total phase delay around said loop is equal to an integer times $2\pi$.

28. A method of forming a resonant cavity from an optical fiber, as defined in claim 27, wherein said fiber optic directional coupler provides $\pi/2$ of said total phase delay.

29. A method of forming a resonant cavity from an optical fiber, as defined in claim 26, additionally comprising:

selecting the coupling constant of said coupler to equal the product of fiber transmission and coupler transmission.

30. A method of forming a resonant cavity from an optical fiber, as defined in claim 26, wherein said fiber comprises a single continuous, uninterrupted strand of single mode fiber optic material.

31. A method of causing light input to an optical fiber to resonate in said fiber, said method comprising:

forming a loop in said fiber;

applying said input light to propagate through said loop; and using a fiber optic coupler to constructively interfere said input light with light propagating through said loop.

* * * * *